3,093,505
COATING MATERIALS
Kells A. Conway, 3238 Wood Valley Road NW.,
Atlanta, Ga.
Filed Mar. 21, 1960, Ser. No. 16,269
5 Claims. (Cl. 117—104)

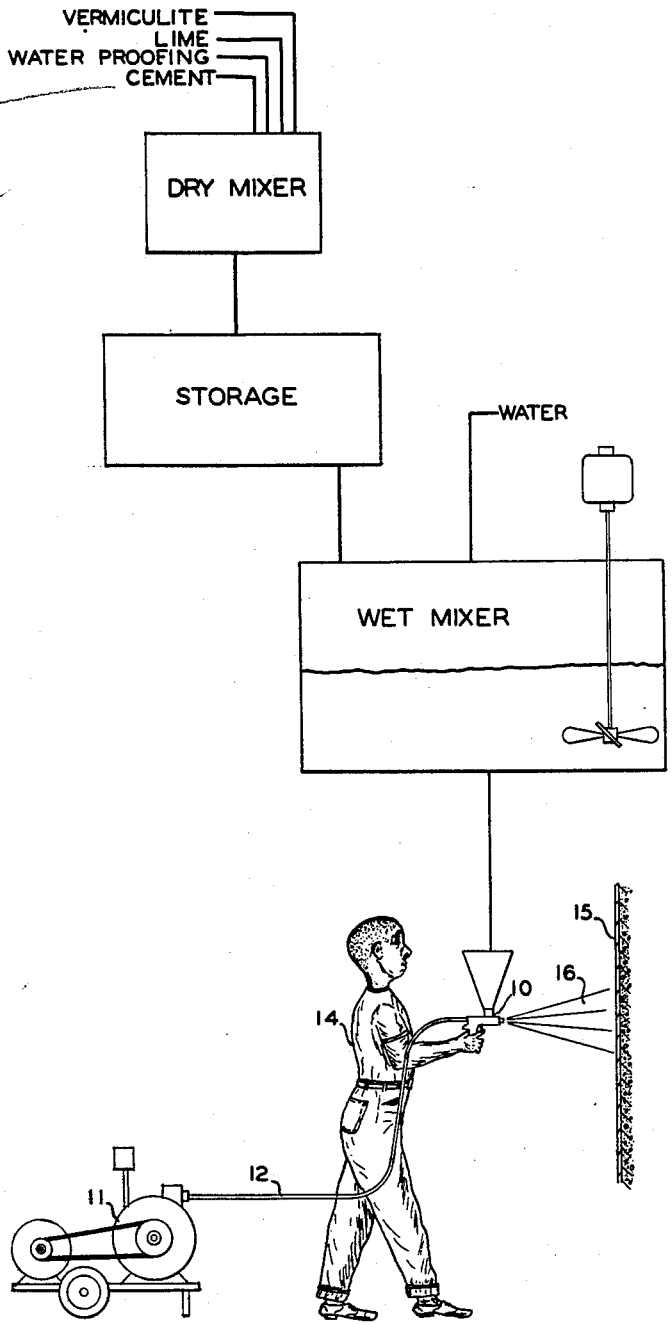

This invention relates to coating materials and is more particularly concerned with a coating material for wall surfaces and a process of applying the same.

In the past, many and varied methods have been employed in an effort to provide the exterior of concrete and the like with a hard smooth surface relatively impervious to moisture. Such methods have included rubbing the concrete surface until relatively smooth and then applying to the rubbed surface a coating of paint containing waterproofing resins. Various forms of plaster containing finely divided silica and other aggregates have been suggested. In substantially all instances, for such materials to be applied successfully, the surface receiving the coating must be treated so as to provide a relatively smooth exterior. Also, the coatings heretofore employed have usually been applied by the use of brushes, rollers, trowels and the like, the consistency of the material preventing its application by means of atomizing or spraying devices.

Recently, the combination of vermiculite with Portland cement and a waterproofing agent has been suggested, such as in U.S. Patent No. 2,377,491, for producing heat-insulating material. Such materials as have heretofore been developed using cement and vermiculite have been employed previously for interior insulating material and as lightweight concrete blocks. When the prior art cement-vermiculite material has been employed as an interior coating, the material was applied with a trowel in much the same manner as the application of plaster. Of course this was a time consuming operation and presented few advantages over the use of conventional plaster.

Even if additional water were to be added to the mixture suggested by the prior art so as to provide a consistency suitable for spraying, the material so modified would not adhere to a vertical surface and hence would be essentially unsuitable for rapid application to a wall, for either an exterior or interior coating.

Contrary to prior art beliefs and practices, I have devised a coating which is well adapted to being applied to either rough or smooth surfaces, such as raw concrete surfaces and metal, without pretreatment to condition the surfaces for receipt thereof. Also, my coating may be applied quickly, evenly and smoothly by means of spray guns, atomizers or the like. When applied and after drying, my coating will withstand years of exposure to the elements without appreciable deterioration.

Briefly, the present invention includes the formation of a slurry which includes water, lime, expanded vermiculite, waterproofing and cement. This slurry is then fed to a spraying machine and thence onto the surface to be coated. The material so applied is sufficiently fluid to cover all pits, cracks, crevices and honeycombs in a concrete surface to provide a uniform texture and yet sufficiently adhesive that is does not readily splatter or run down the wall. When dry, my material does not readily flake, peel or sluff off even when subjected to moisture, rain, dryness and variation in temperature.

Accordingly, it is an object of the present invention to provide a coating material which is inexpensive to manufacture and is quickly and easily applied to vertical surfaces and is durable when dry or cured.

Another object of the present invention is to provide a coating material which is capable of being applied to the usual exterior of buildings and the like without the usual preconditioning of the walls to receive the material, the coating material being well suited for application to concrete, steel, wood and other usual building materials.

Another object of the present invention is to provide a method of applying the novel coating material of the present invention to a surface of concrete, which method results in the quick and easy distribution of a relatively large amount of the coating material over a relatively large area without the necessity of employing brushes, trowels or the like.

Another object of the present invention is to provide a method of applying the coating material of the present invention in a less expensive and more effective manner than has heretofore been employed, the coating thus requiring less labor and time to apply.

Another object of the present invention is to provide a coating material which is well suited for both interior and exterior application, the coating being capable of being applied by an unskilled or semi-skilled laborer and providing a relatively permanent impervious surface.

Other and further objects, features and advantages of the present invention will become apparent from the following description when taken in conjunction with the accompanying drawing which is a schematic flow chart of the process of the present invention.

Referring now in detail to the embodiments chosen for the purpose of illustrating the present invention, I have devised two basic formulations of coating material for use according to the present invention, one formulation being suitable for exterior coatings to form the exterior surface of concrete and/or metal structures and the other to be used to form interior coatings as a substitute for the plaster normally employed to produce the surface of walls and ceilings within rooms within a building.

The exterior coating is produced by an admixture at ordinary atmospheric temperatures of the ingredients listed by weight in Table I hereof.

Table I

| | Percent |
|---|---|
| White Portland cement | 33.6 |
| Lime | 11.9 |
| Vermiculite | 6.7 |
| Waterproofing | .1 |
| Water | 47.7 |

Such pigments as may be desired may be employed in the above mixture so as to impart a desired color to the coating; however, the resulting mixture has such a pleasing white color that, in most instances, I have found such pigments to be unnecessary.

When the coating is to be employed on the interior walls and ceiling of a room, Keene's cement is substituted for white Portland cement. Keene's cement is a special form of gypsum containing calcium sulfate and alum.

When preparing the ingredients, the ingredients may be mixed in a dry state and stored until ready for use. Then the water is mixed therewith. The dry mix preferably contains the ingredients and amounts listed in Table II hereof.

Table II

| | Percent |
|---|---|
| White Portland cement | 64.3 |
| Lime | 22.7 |
| Vermiculite | 12.8 |
| Waterproofing | .2 |

While it will be understood that I have described above the preferred embodiments of the present invention, the ingredients, of course, may be varied without departing from the scope of the present invention. In Table III hereof I have listed the maximum and minimum variations in weight in the amounts of the various ingredients.

Table III

| | Maximum, percent | Minimum, percent |
|---|---|---|
| Atlas White Portland Cement | 41.0 | 27.0 |
| Lime | 19.3 | 10.5 |
| Vermiculite | 10.2 | 5.9 |
| Waterproofing | .3 | 0 |
| Water | 49.1 | 42.3 |

The vermiculite employed in the above formulas is expanded vermiculite in finely divided form.

Preferably a vermiculite having a specific gravity of about eight pounds per cubic foot and a particle distribution as follows should be employed:

| Sieve Size | Percentage Retained on each other | |
|---|---|---|
| | Maximum | Minimum |
| No. 4 (4760 microns) | 0 | |
| No. 8 (2380 microns) | 10 | 0 |
| No. 16 (1190 microns) | 75 | 40 |
| No. 30 (590 microns) | 95 | 65 |
| No. 50 (297 microns) | 98 | 75 |
| No. 100 (149 microns) | 100 | 90 |

Thus it is seen that in the preferred embodiment of the present invention the vermiculite should have a particle size such that the maximum size along its longest diameter should be less than 4760 microns.

The waterproofing may be selected from many commercially available waterproofing agents, such as aluminum stearate or the like. Such waterproofing agents, known in the trade as "Hydrocide," "Omicrom," "Trimix" or "Silicone RE 230" are suitable.

The purpose of using the cement in the formulation heretofore set forth is to provide color and to provide a base or binder for the remaining ingredients. The lime is employed to provide elasticity necessary for the material to adhere to the surface when sprayed and also for color. Too much lime will cause flaking of the material when dry and too little lime would permit the cement to lump and the cement would not adhere or cling to the surface when sprayed. The mixture with too little lime would splash and be deflected from the hard concrete or metal surface.

Preferably I employ a lime knon in the trade as Ivory Fine lime having the following analysis:

| | Percent |
|---|---|
| CaO | 44.0 |
| MgO | 29.2 |
| $SiO_2$ | 0.2 |
| $R_2O_3$ | 0.3 |
| $SO_3$ | 0.5 |
| Ignition loss | 25.5 |

When my material is applied, it is sprayed from a spray gun employing compressed air. Preferably a gun such as an E-Z-Tex spray gun produced by E-Z-On Corporation of Chicago is suitable for such use. It will be understood that other spray guns of the type wherein the material heretofore specified is fed in a stream to a jet of rapidly moving air are suitable.

Thus it is seen that in applying my coating the slurry when mixed together is fed in small substantially continuous increments to a continuous blast of air or other inert gas. The air or other inert gas entrains the stream of slurry, deflecting this slurry at about a right angle so as to direct the material at relatively high velocity onto the concrete or metal wall.

In the drawing I have illustrated that the vermiculite, cement, lime and waterproofing is mixed in a dry mixer such as a ball mill or concrete mixer and then stored for future use, such as in bags. When the material is to be used, it is mixed with water and fed to a spray gun 10 driven by compressed air from the air compressor 11, the air being fed to the spray gun 10 through a tube or conduit 12.

The workman 14 holding the gun 10 stands a short distance from the concrete wall 15 which is to be sprayed and directs the stream 16 of air and slurry against the wall 15.

The vermiculite being relatively lightweight, aggregates which are carried with the slurry and air at high velocities tend to penetrate with the slurry, the cracks, crevices and other openings in the concrete wall 15. The smooth surface of the vermiculite permits a sliding action between particles to take place whereby the slurry sprayed from the gun tends to flow evenly without separating over the entire surface of wall 15.

When the slurry is applied over the surface of wall 15 to provide the desired coating, the coating is permitted to dry and cure in the ambient air until firm and hard, say for about eight hours.

In order to test the present invention, the exterior columns and beams of a large patio and the interior wall of a large room which in the winter was heated on certain days and left unheated during other days and nights was coated with a mixture produced according to the present invention. The interior coating material had the following ingredients:

| | Pounds |
|---|---|
| Keene's cement | 141 |
| Lime | 50 |
| Waterproofing (Omicrom) | ½ |
| Vermiculite | 28 |
| Water | 220 |

The exterior coating was produced by substituting Portland cement for Keene's cement.

After applying, the coatings were inspected periodically for deterioration. At the end of a twenty-four month period, no appreciable deterioration was detected.

To further test the coatings of the present invention, a number of concrete slabs were coated with variations in the ingredients listed in Table I and then permitted to dry and cure for one hundred-fifty hours. The coatings were then examined by random selection for color, texture, bond strength and hardness. The results of this physical examination are given in Table IV hereof.

Table IV

| Formula No. | 1 | 2 | 3 | 4 | 5 | 6 | 7 | 8 |
|---|---|---|---|---|---|---|---|---|
| Ingredients Percentage by Weight: | | | | | | | | |
| White Cement, percent | 38.2 | 35.7 | 33.6 | 29.4 | 27.1 | 20.1 | 24.2 | 32.7 |
| Lime, percent | 0 | 6.3 | 11.9 | 15.6 | 19.3 | 14.3 | 11.5 | 11.7 |
| Zonolite, percent | 7.6 | 7.1 | 6.7 | 5.8 | 5.4 | 8.0 | 6.5 | 6.5 |
| Omicrom, percent | 0.1 | 0.1 | 0.1 | 0.1 | 0.1 | 0.1 | 0.1 | 0.1 |
| Water, percent | 54.1 | 50.8 | 47.7 | 49.1 | 48.1 | 57.4 | 57.7 | 46.8 |
| Color | Poor | Med | Excel | Excel | Excel | Med | Excel | Excel |
| Exposure test | Poor | Poor | Med | Excel | Good | Med | Med | Med |
| Initial Exam | Poor | Poor | Excel | Med | Poor | Poor | Poor | Good |
| Application | Poor | Med | Excel | Excel | Excel | Poor | Poor | Poor |

| Formula No. | 9 | 10 | 11 | 12 | 13 | 14 | 15 |
|---|---|---|---|---|---|---|---|
| Ingredients Percentage by Weight: | | | | | | | |
| White Cement, percent | 38.6 | 39.0 | 33.3 | 33.0 | 31.2 | 25.8 | 20.0 |
| Lime, percent | 11.0 | 9.3 | 11.9 | 11.7 | 11.1 | 9.1 | 7.1 |
| Zonolite, percent | 5.2 | 5.2 | 6.7 | 6.6 | 6.2 | 10.2 | 15.9 |
| Omicrom, percent | 0.1 | 0.1 | 0.5 | 1.9 | 7.1 | 0.1 | 0.1 |
| Water, percent | 44.1 | 46.4 | 47.6 | 46.8 | 44.4 | 54.8 | 56.9 |
| Color | Good | Excel | Excel | Good | Poor | Excel | Excel |
| Exposure test | Excel | Excel | Excel | Poor | Poor | Poor | Poor |
| Initial Exam | Poor | Poor | Poor | Good | Poor | Excel | |
| Application | Good | Poor | Excel | Good | Poor | Poor | Poor |

It will be obvious to those skilled in the art that many variations may be made in the embodiments chosen for the purpose of illustrating the present invention without departing from the scope thereof as defined by the appended claims.

I claim:

1. Process of coating an exterior surface of a structure comprising the steps of mixing together by weight from 27.0% to 41.0% white Portland cement, from 10.5% to 19.3% lime, from 5.9% to 10.2% expanded vermiculite, and from 42.3% to 49.1% water to produce a slurry, feeding the slurry in a stream, directing air onto said stream to deflect the stream of slurry and entrain the slurry in said air and directing the air and slurry onto said exterior surface.

2. Process of coating a surface comprising the steps of mixing together by weight from 27.0% to 41.0% a binder selected from the group consisting of white Portland cement and Keene's cement, from 10.5% to 19.3% lime, from 5.9% to 10.2% expanded vermiculite, up to .3% a waterproofing agent and the remainder water to produce a slurry, and spraying said slurry onto said surface to provide a continuous layer.

3. The process defined in claim 2 wherein said surface is a concrete surface.

4. The process defined in claim 2 wherein said surface is a metal surface.

5. The process defined in claim 2 wherein the spraying of said slurry onto said surface includes the steps of directing said slurry in a stream, entraining said stream in a stream of air, and directing said gas and said slurry onto said surface.

References Cited in the file of this patent

UNITED STATES PATENTS

| | | |
|---|---|---|
| 2,377,491 | Goodrich et al. | June 5, 1945 |
| 2,504,805 | Clipson | Apr. 18, 1950 |
| 2,602,759 | Mollo | July 8, 1952 |
| 2,728,681 | Clipson | Dec. 27, 1955 |